Patented Apr. 4, 1933

1,903,397

UNITED STATES PATENT OFFICE

BRUNO REWALD, OF HAMBURG, GERMANY

METHOD OF SEPARATING FATTY CONSTITUENTS FROM OLEAGINOUS MATERIALS

No Drawing. Application filed April 24, 1931, Serial No. 532,703, and in Germany July 29, 1930.

It is a known fact that the pressing out to the desired extent of the cocoa butter contained in cocoa beans is associated with very great labour and expense.

The cocoa beans, freed from their husks, treated with a solution of alkali carbonate or the like and then roasted, are first roughly ground and thereafter finely ground, whereby they are converted to a semi-fluid condition. The cocoa mass so obtained which consists of up to about 55% of cocoa butter together with other materials is then pressed in known manner.

It has already been proposed for the purpose of separating the cocoa fat, to mix with cocoa beans, rubbed to a fluid paste, honey, sugar-containing solutions, milk, malt extract, fruit syrups or vegetable mucilage before the pressing out of the cocoa butter. In this manner a corresponding proportion of foreign materials passed into the cocoa powder which could not, or could only with great difficulty, be removed therefrom, so that its properties were considerably altered.

I have now found that the pressing out of the cocoa butter from the cocoa mass can considerably be facilitated and hastened and the yield of cocoa butter in a short time increased, if the cocoa mass is provided with a relatively small addition of about .2 to 1.5% of lecithin, preferably vegetable lecithin, such for example as that obtained from soya beans. The good influence of the addition of lecithin in the pressing operation is clearly to be ascribed to the fact that the viscosity of the cocoa butter, and as a result the surface resistance are reduced.

It is already known to produce lecithin-cocoa powder and lecithin-chocolate for the purpose of increasing the nourishment and the dietetic action and for effecting other improvements therein. In the production of such lecithin-containing cocoa products, however, the lecithin until now has been added only to the finished or previously pressed out cocoa powder or to the finished chocolate. Lecithin, on the other hand, has never been added to the cocoa material still containing its entire quantity of cocoa butter for the purpose of facilitating the pressing operation, and to increase the quantity of valuable cocoa butter.

The vegetable lecithin to be employed in the carrying out of the process can be added directly or in mixture with a small amount of cocoa butter. For example there may be added, about 1% thereof, calculated on the amount of the semi-fluid cocoa material (or chocolate mass), but various amounts between 0.2% and 1.5 or 2%, more or less, can be used. The addition is best effected to the finely ground material so that the lecithin prior to the pressing is uniformly distributed therein. The pressing takes place in the usual manner, however, with the result that the cocoa butter is considerably more readily pressed out with the use of less power and that the yield of a cocoa butter is increased.

The working of the process will be seen from the following table:

| Pressure in atmospheres | Cocoa butter expressed in kgs. | | Duration of pressing in minutes | |
|---|---|---|---|---|
| | Without | With | Without | With 2 percent lecithin |
| 1st phase 1-30 | 8 | 8 | 12 | 11 |
| 2nd phase 31-100 | 20 | 24 | 18 | 15 |
| 3rd phase 101-300 | 10 | 12 | 20 | 10 |
| Total | 38 kgs. | 44 kgs. | 50 min. | 36 min. |

The process is not limited only to the production of cocoa butter from cocoa beans, but can be employed also with similar results with other oil seeds with a high fat content in which only very small quantities of lecithin are present.

What I claim is:—

1. Method of separating fatty constituents from seed material having a high content of an oleaginous constituent and a substance which is not soluble in said oleaginous constituent, and which material does not contain a large percentage of lecinthin, which process comprises incorporating a small percentage of lecithin with said material and subjecting the mixture to a sufficient pressure to squeeze out oleaginous constituents therefrom.

2. Method of separating fatty constituents from oleaginous seed material having a high content of an oleaginous constituent and a substance which is not soluble in said oleaginous constituent, and which material does not contain a large percentage of lecithin, which process comprises grinding said material, incorporating a small percentage of lecithin with said material and subjecting the mixture to a sufficient pressure to squeeze out oleaginous constituents therefrom.

3. Method of separating cocoa butter from cocoa beans comprising grinding cocoa beans, adding 0.2 to 2% of lecithin to said ground cocoa beans and subjecting the mixture of lecithin and cocoa beans to the action of pressure.

4. Method of separating fatty constituents from highly oleaginous seed material comprising treating said material with small quantities of lecithin and subjecting said mixture to pressure.

5. Method of separating fatty constituents from highly oleaginous seeds, comprising grinding said seeds, adding to said ground material a small proportion of lecithin and subjecting the mixture of ground material and lecithin to pressure.

6. Method of separating cocoa butter from cocoa beans comprising grinding cocoa beans, adding a small per cent of lecithin to said ground cocoa beans and subjecting the mixture of lecithin and cocoa beans to the action of pressure.

7. Method of separating cocoa butter from cocoa beans comprising grinding cocoa beans, adding lecithin to said ground cocoa beans and subjecting the mixture of lecithin and cocoa beans to the action of pressure.

8. Method of separating fatty constituents from seed material having a high content of a substantially solid oil and which seed material does not contain a large percentage of lecithin, which process comprises incorporating a small percentage of lecithin with said material and subjecting the mixture to a sufficient pressure to squeeze out oleaginous constituents therefrom.

9. Method of separating fatty constituents from oleaginous seed material having a high content of a solid oil and which seed material does not contain a large percentage of lecithin, which process comprises grinding said material, incorporating a small percentage of lecithin with said material and subjecting the mixture to a sufficient pressure to squeeze out oleaginous constituents therefrom.

In testimony whereof I affix my signature.

BRUNO REWALD.